United States Patent
Lee

(10) Patent No.: US 9,542,026 B2
(45) Date of Patent: Jan. 10, 2017

(54) DISPLAY DEVICE AND DRIVING METHOD THEREOF

(71) Applicant: LG Display Co., Ltd., Seoul (KR)

(72) Inventor: Young Joon Lee, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 66 days.

(21) Appl. No.: 14/509,838

(22) Filed: Oct. 8, 2014

(65) Prior Publication Data

US 2015/0185937 A1    Jul. 2, 2015

(30) Foreign Application Priority Data

Dec. 30, 2013  (KR) .................. 10-2013-0167780

(51) Int. Cl.
*G06F 3/041* (2006.01)
*G09G 3/20* (2006.01)
*G09G 3/36* (2006.01)

(52) U.S. Cl.
CPC ........... *G06F 3/0412* (2013.01); *G06F 3/0416* (2013.01); *G09G 3/2092* (2013.01); *G09G 3/3648* (2013.01); *G09G 3/3688* (2013.01); *G09G 2300/0426* (2013.01); *G09G 2310/0297* (2013.01); *G09G 2320/0223* (2013.01); *G09G 2354/00* (2013.01)

(58) Field of Classification Search
CPC .... G06F 3/0412; G06F 3/0416; G09G 3/2092; G09G 2300/0426; G09G 3/3648; G09G 2310/0297; G09G 2320/0233; G09G 2354/00; G09G 3/3688
See application file for complete search history.

(56) References Cited

U.S. PATENT DOCUMENTS

| 9,058,072 B2* | 6/2015 | Bae ..................... G06F 3/041 |
| 2010/0194695 A1* | 8/2010 | Hotelling ............. G06F 3/0412 345/173 |
| 2010/0194697 A1* | 8/2010 | Hotelling ............. G06F 3/0412 345/173 |
| 2011/0267312 A1 | 11/2011 | Lin et al. |
| 2012/0169662 A1 | 7/2012 | Chan et al. |
| 2012/0274603 A1 | 11/2012 | Kim et al. |
| 2013/0044064 A1 | 2/2013 | Chan |
| 2013/0147724 A1 | 6/2013 | Hwang et al. |

(Continued)

FOREIGN PATENT DOCUMENTS

| CN | 103197791 A | 7/2013 |
| TW | 201322067 A | 6/2013 |
| TW | 201349052 A | 12/2013 |

*Primary Examiner* — Ilana Spar
*Assistant Examiner* — Mihir K Rayan
(74) *Attorney, Agent, or Firm* — Fenwick & West LLP

(57) ABSTRACT

Disclosed is a display device. The display device includes a panel into which a touch panel including a plurality of driving electrodes and a plurality of receiving electrodes is built, a touch sensing unit configured to supply a plurality of sensing pulses to the plurality of driving electrodes during a touch sensing period, a driver configured to drive the panel to allow the panel to display an image during an image display period, and a data line controller configured to connect a plurality of data lines to ground in a sensing pulse non-output period where the plurality of the sensing pulses are not supplied to the plurality of driving electrodes during the touch sensing period.

14 Claims, 7 Drawing Sheets

(56) References Cited

U.S. PATENT DOCUMENTS

| | | | |
|---|---|---|---|
| 2013/0147744 A1* | 6/2013 | Kim | G06F 3/0412 |
| | | | 345/173 |
| 2013/0314342 A1 | 11/2013 | Kim et al. | |
| 2013/0342478 A1* | 12/2013 | Bae | G06F 3/041 |
| | | | 345/173 |
| 2015/0002421 A1* | 1/2015 | Kim | G06F 3/041 |
| | | | 345/173 |

* cited by examiner

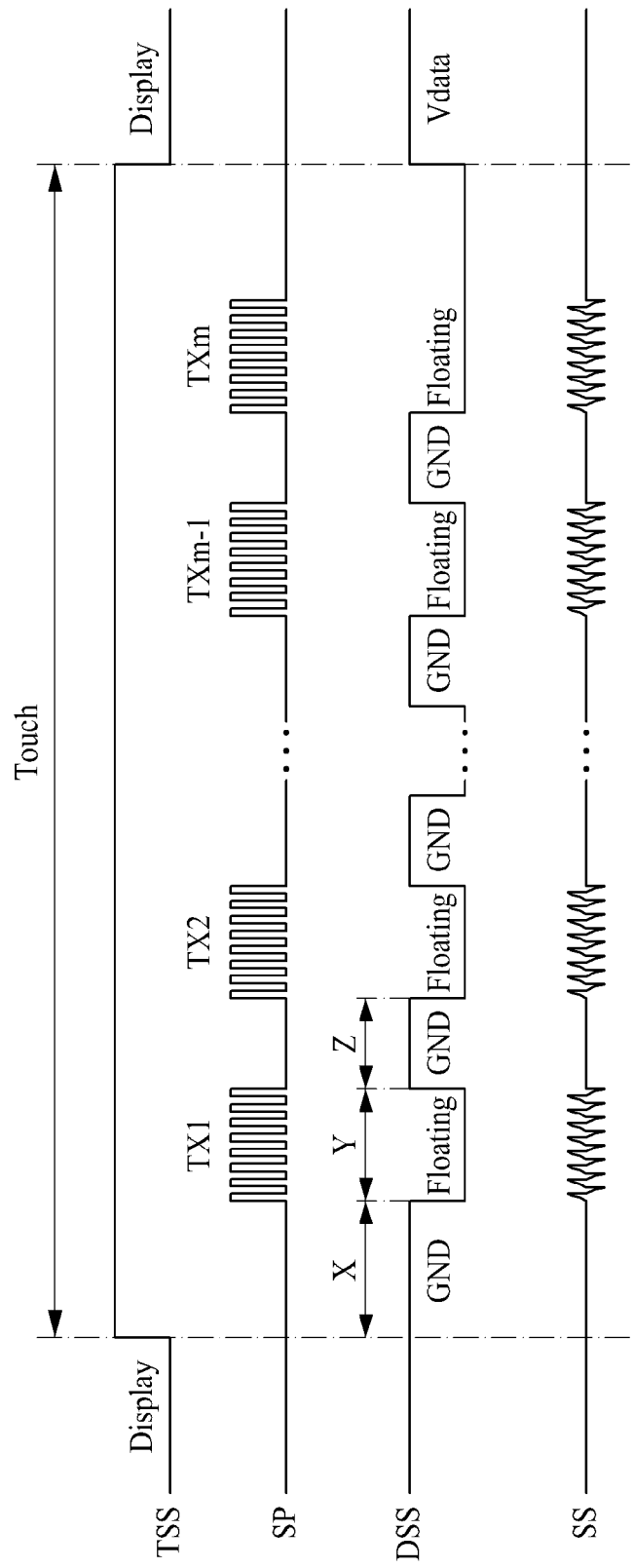

DISPLAY DEVICE AND DRIVING METHOD THEREOF

CROSS-REFERENCE TO RELATED APPLICATIONS

This application claims the benefit of the Korean Patent Application No. 10-2013-0167780 filed on Dec. 30, 2013, which is hereby incorporated by reference as if fully set forth herein.

BACKGROUND

Field of the Invention

The present invention relates to a display device and a driving method thereof, and more particularly, to a display device including a panel with a built-in touch panel and a driving method thereof.

Discussion of the Related Art

Touch panels are a type of input device that is included in display devices such as liquid crystal display (LCD) devices, plasma display panels (PDPs), organic light emitting display device (OLED), and electrophoretic displays (EPDs), and enables a user to input information by directly touching a screen with a finger, a pen or the like while looking at the screen of the display device.

Particularly, the demand for display devices integrated with in-cell type touch screen, which include a plurality of built-in elements configuring the touch screen for slimming portable terminals such as smart phones and tablet personal computers (PCs), is recently increasing.

In-cell type display devices may be categorized into mutual type display devices and self-capacitive type display devices.

FIG. 1 is an exemplary diagram illustrating a configuration of a related art in-cell display device using a mutual type. FIG. 2 is a waveform diagram showing an image display period and a touch sensing period in the related art in-cell display device using the mutual type. FIGS. 3 and 4 are waveform diagrams of a data line applied to the related art in-cell display device using the mutual type. FIG. 3 (a) and FIG. 4 (a) are exemplary diagrams showing waveforms of a data line. FIG. 3 (b) and FIG. 4 (b) show a touch sync signal for distinguishing an image display period and a touch sensing period.

The in-cell display device using the mutual type (hereinafter simply referred to as an in-cell display device), as illustrated in FIG. 1, includes: a receiving electrode RX that is formed in a block form in parallel with a data line in a display area 11 of a panel 10; a driving electrode TX that is configured with a plurality of driving electrode parts 11 disposed with the receiving electrode RX therebetween in the display area 11 and is formed in parallel with a gate line; a display driver 50 that is provided in a non-display area of the panel 10, controls signals output to the data line and the gate line, and applies a common voltage or a sensing pulse to the driving electrode TX and the receiving electrode RX; a receiving electrode line that extends from the receiving electrode RX, and is connected to the display driver 50; a driving electrode line that extends from the driving electrode part 11 in parallel with the data line, and is connected to the display driver 50; and a touch sensing unit (not shown) that determines whether there is a touch, by using the driving electrode and the receiving electrode which are connected to each other through the display driver 50.

As described above, in the related art in-cell display device, as shown in FIG. 2, a period (hereinafter simply referred to as one frame period) corresponding to one frame is divided into the image display period and the touch sensing period.

That is, the related art in-cell display device simultaneously performs an image display function and a touch sensing function. A plurality of common electrodes for image display performs a function of the driving electrode when the panel 10 operates in a touch sensing mode.

Therefore, a touch panel applied to the in-cell display device includes the driving electrode TX, which is supplied with a common voltage in the image display period and is supplied with a sensing pulse in the touch sensing period, and the receiving electrode RX that is supplied with the common voltage in the image display period and is supplied with a reference voltage in the touch sensing period.

In this case, in the image display period, the common voltage is supplied to the driving electrode TX and the receiving electrode RX. Also, in the touch sensing period, a sensing pulse is supplied to the driving electrode TX, and the reference voltage is supplied to the receiving electrode.

When one frame starts, the image display period is first performed, and after the image display period, the touch sensing period is performed. However, the order where the image display period is performed and the order where the touch sensing period is performed may be switched.

In the related art display device having the above-described configuration, during the touch sensing period, a plurality of the data lines may be connected to ground GND, or may be maintained in a floating state.

First, during the touch sensing period, the data lines may be connected to ground GND so as to stabilize the data lines.

The receiving electrode that is disposed in the same direction as that of the data line is formed in the panel 10 so as to overlap the data line, and thus, when the data line is connected to ground, a capacitor is formed between the data line and the receiving electrode RX. The capacitor formed between the data line and the receiving electrode RX is a parasitic capacitor of the receiving electrode RX.

Due to the parasitic capacitor, as shown in FIG. 3, noise occurs in the data line. The parasitic capacitor of the receiving electrode RX reduces performance in which the touch sensing unit determines whether the touch panel is touched.

Second, when the data lines are connected to ground during the touch sensing period, as described above, the parasitic capacitor is formed, and thus, a touch sensitivity of the touch sensing unit can be reduced. In order to increase the touch sensitivity of the touch sensing unit by decreasing the number of the parasitic capacitors, the data lines may be maintained in a floating state during the touch sensing period.

However, in a state where the data line is floated, when whether the touch panel is touched is determined, whether a first driving electrode TX1 is touched cannot normally be performed due to instability of the data line.

For example, as shown in FIG. 4, in order to decrease the number of the parasitic capacitors, when the data line that holds an arbitrary data voltage during the image display period (which denotes a period labeled "Display" in FIG. 4) is changed to a floating state in the touch sensing period (which denotes a period labeled "Touch" in FIG. 4), the data line is unstably maintained according to an arbitrary voltage value which is held during the image display period.

In this state, when the sensing pulse is supplied to the driving electrode TX for touch sensing, a coupling component is generated between the sensing pulse and a voltage of the data line. A plurality of the coupling components are generated in different sizes in the first driving electrode TX, which is first supplied with the sensing pulse, and the driving electrodes (including a second driving electrode TX2) which are supplied with the sensing pulse after the first driving electrode TX1.

Therefore, a deviation of a plurality of sensing signals respectively received from the driving electrodes subsequent to the first driving electrode can occur.

During the touch sensing period, when the data line is connected to ground, a parasitic capacitor is formed between the data line and the receiving electrode RX, and thus, a touch sensing function is reduced. During the touch sensing period, when the data line is maintained in a floating state, a deviation of a sensing signal (received from a driving electrode which is first supplied with the sensing pulse) and a plurality of sensing signals respectively received from the other driving electrodes occurs, and thus, touch sensitivity is reduced.

To provide an additional description, in FIG. 3 (a) and FIG. 4 (a), an area illustrated as TX1 denotes a timing when the sensing pulse is supplied to the first driving electrode TX1, and an area illustrated as TX2 denotes a timing when the sensing pulse is supplied to the second driving electrode TX2. That is, when the data line is connected to ground or is maintained in a floating state, as shown in FIG. 3 (a) and FIG. 4 (a), an unstable voltage is induced to the data line while the sensing pulse is being supplied to the first and second driving electrodes, and thus, whether the first and second driving electrodes are touched cannot accurately be performed.

SUMMARY

Accordingly, the present invention is directed to provide a display device and a driving method thereof that substantially obviate one or more problems due to limitations and disadvantages of the related art.

An aspect of the present invention is directed to provide a display device and a driving method thereof, which connect a plurality of data lines to a ground in a sensing pulse non-output period where a plurality of sensing pulses are not supplied to a plurality of driving electrodes, and float the data lines in a sensing pulse output period where the sensing pulses are supplied to the driving electrodes, during a touch sensing period.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a method of driving a display device including: connecting a plurality of data lines, formed in a panel, to ground during a touch preparation period after a touch sensing period arrives until a plurality of sensing pulses are supplied to a plurality of driving electrodes; and floating the plurality of data lines while the plurality of sensing pulses are supplied to the plurality of driving electrodes until the touch sensing period is ended after the touch preparation period.

In another aspect of the present invention, there is provided a display device including: a panel into which a touch panel including a plurality of driving electrodes and a plurality of receiving electrodes is built; a touch sensing unit configured to supply a plurality of sensing pulses to the plurality of driving electrodes during a touch sensing period; a driver configured to drive the panel to allow the panel to display an image during an image display period; and a data line controller configured to connect a plurality of data lines to ground in a sensing pulse non-output period where the plurality of the sensing pulses are not supplied to the plurality of driving electrodes during the touch sensing period.

In another aspect of the present invention, there is provided a method of driving a display device including: connecting a plurality of data lines of the display panel to a data driver to drive a portion of the display device during a display period of a frame; and driving a touch sensor portion of the display device during a sense period of the frame, wherein driving the touch sensor comprises connecting the plurality of data lines to ground during a preparation portion of the sense period, sequentially supplying a plurality of sensing pulses to a plurality of driving electrodes during a sensing portion of the sense period, and floating one or more of the plurality of data lines during the sensing portion of the sense period while sensing pulses are being supplied to at least one of the plurality of driving electrodes.

In yet another aspect of the present invention, there is provided a display device including: a data driver configured to drive the display portion of the display panel; a plurality of switches each of which is coupled to a corresponding one of the plurality of data lines; a controller configured to control operation of the plurality of switches, wherein the controller controls the switches to connect the plurality of data lines to the data driver during a display period of a frame, connect the plurality of data lines to ground during a preparation portion of a sense period of the frame, and float one or more of the plurality of data lines during a sensing portion of the sense period while a plurality of sensing pulses are supplied to at least one of the plurality of driving electrodes.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 8 is an exemplary diagram showing various kinds of waveforms applied to a method of driving a display device according to an embodiment of the present invention.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of the present invention will be described in detail with reference to the accompanying drawings.

Hereinafter, for convenience of description, an LCD device will be described as an example of the present invention, but the present invention is not limited thereto. That is, the present invention may be applied to various display devices that display an image by using a common electrode and a common voltage.

Figure 1:
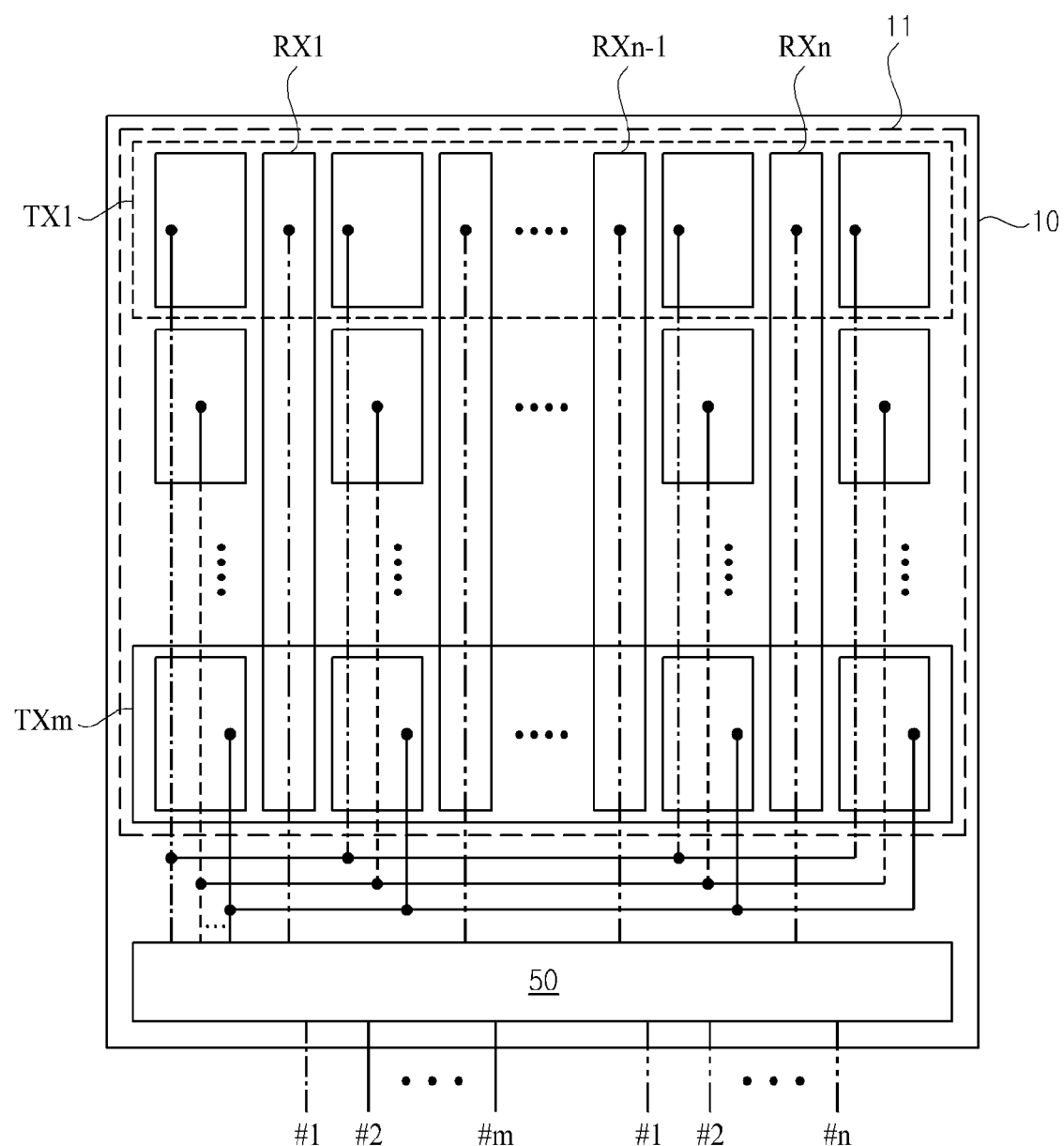
FIG. 1 is an exemplary diagram illustrating a configuration of a related art in-cell display device using a mutual type.
Figure 2:
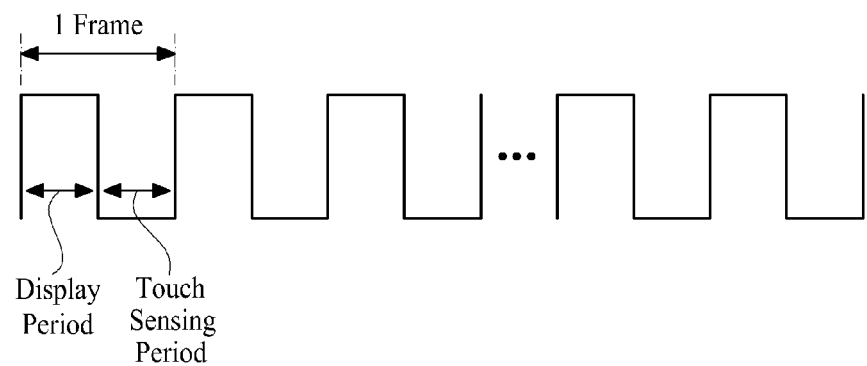
FIG. 2 is a waveform diagram showing an image display period and a touch sensing period in the related art in-cell display device using the mutual type.
Figure 3:
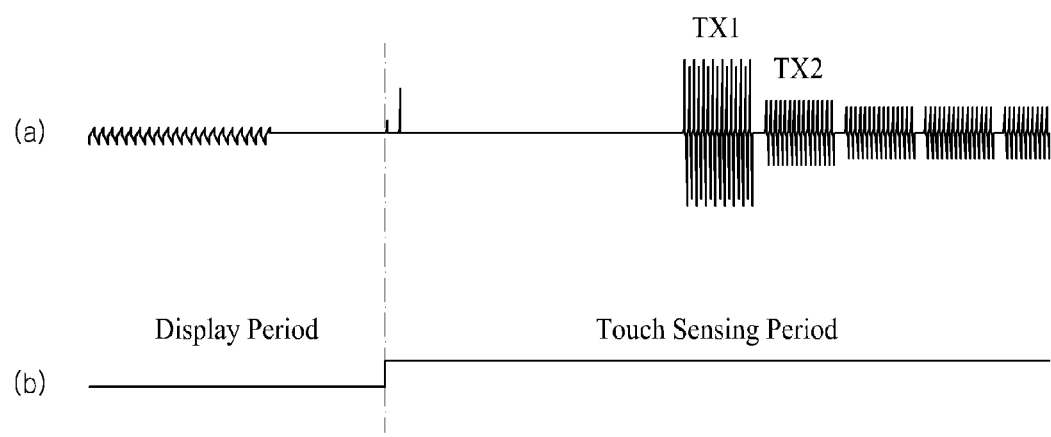
FIGS. 3 and 4 are waveform diagrams of a data line applied to the related art in-cell display device using the mutual type.
Figure 4:
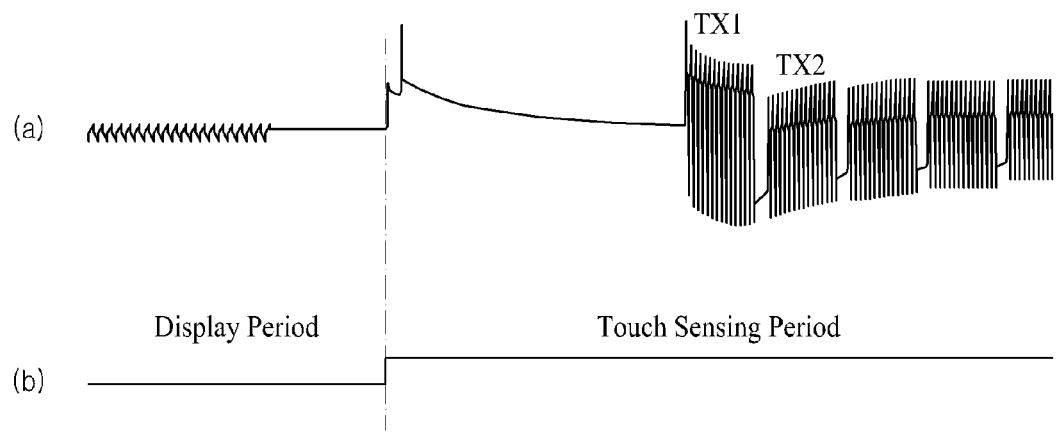
Figure 5:
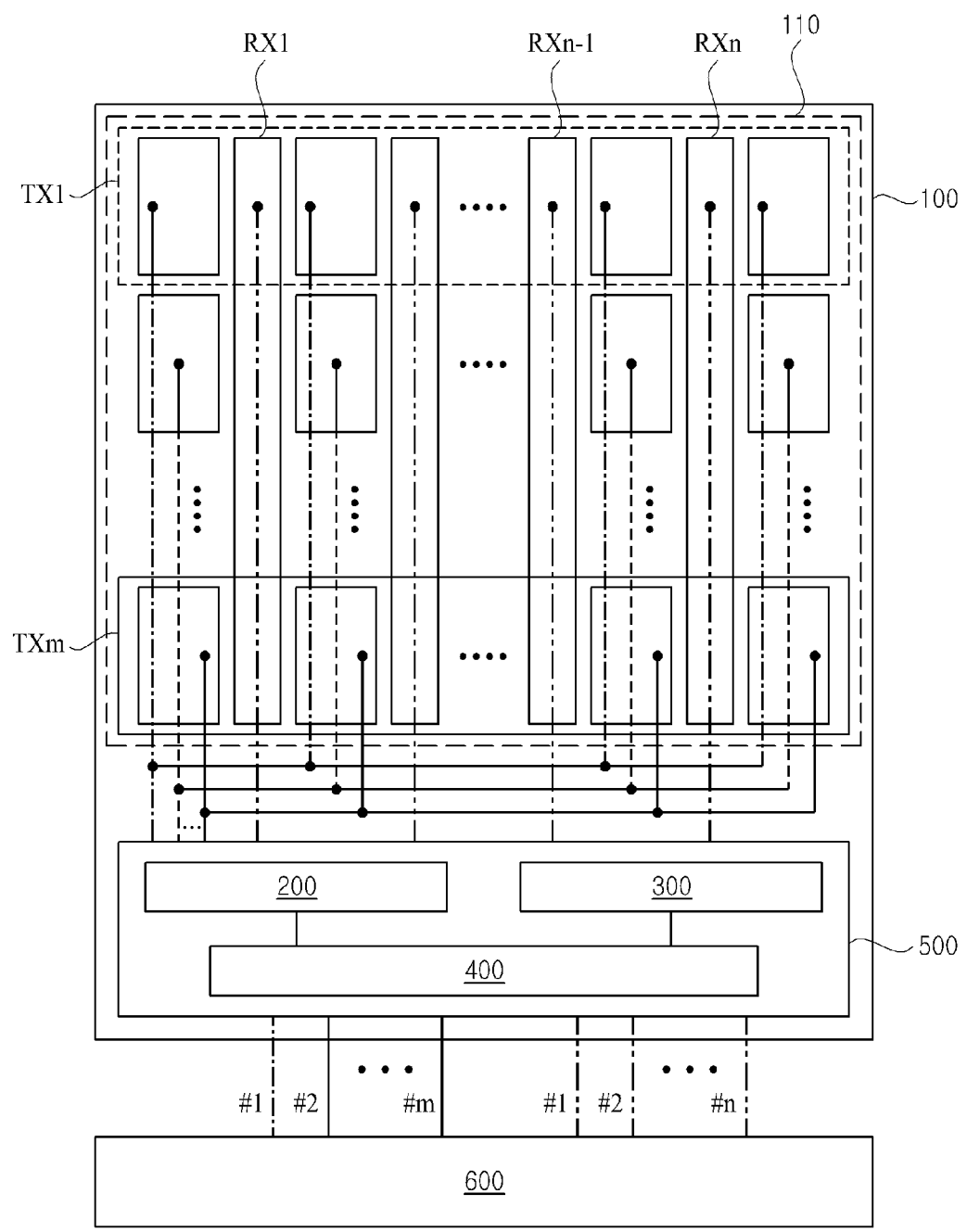
FIG. 5 is an exemplary diagram illustrating a configuration of a display device according to an embodiment of the present invention.

FIG. 5 is an exemplary diagram illustrating a configuration of a display device according to an embodiment of the present invention, and illustrates a mutual type display device. Hereinafter, basic elements and driving method of the display device according to an embodiment of the present invention will be described.

The display device according to an embodiment of the present invention, as illustrated in FIG. 5, includes: a panel 100 into which a touch panel 110 including a plurality of driving electrodes TX1 to TXm and a plurality of receiving electrodes RX1 to RXn is built; a touch sensing unit 600 that sequentially supplies a sensing pulse to the driving electrodes to determine whether the touch panel 110 is touched, during a touch sensing period; a driver 500 that drives the panel 100 to allow the panel 100 to display an image during an image display period; a data line controller (not shown) that connects a plurality of data lines to a ground in a sensing pulse non-output period where a plurality of the sensing pulses are not supplied to the driving electrodes during the touch sensing period.

In other words, the display device includes: a display panel 100 including a display portion and a touch portion 110, the display portion including a plurality of data lines, and the touch portion 110 including a plurality of driving electrodes TX1 to TXm and a plurality of receiving electrodes RX1 to RXn; a data driver 300 configured to drive the display portion of the display panel 100; a plurality of switches (not shown) each switch which is coupled to a corresponding one of the plurality of data lines; and a controller 400 configured to control operation of the plurality of switches, wherein the controller controls the switches to: connect the plurality of data lines to the data driver 300 during a display period of a frame, connect the plurality of data lines to ground during a preparation portion of a sense period of the frame, and float one or more of the plurality of data lines during a sensing portion of the sensing period while a plurality of sensing pulses are supplied to at least one of the plurality of driving electrodes.

The panel 100 performs a function of displaying an image. A mutual type touch panel 110 including the plurality of driving electrodes TX1 to TXm and the plurality of receiving electrodes RX1 to RXn is built into the panel 100.

That is, the panel 100 displays an image according to a common voltage which is supplied to the driving electrodes TX1 to TXm and the receiving electrodes RX1 to RXn.

The panel 100 may be changed depending on the kind of the display device. In particular, when the display device is an LCD device, the panel 100 is a liquid crystal panel in which a liquid crystal layer is formed between two glass substrates.

In this case, the plurality of data lines, a plurality of gate lines that intersect the data lines, a plurality of thin film transistors (TFTs) that are respectively formed in intersection areas of the data lines and the gate lines, a plurality of pixel electrodes for charging data voltages into the pixels, and a common electrode that drives liquid crystal charged into the liquid crystal layer along with the pixel electrodes are formed on a lower glass substrate of the panel 100. In the present embodiment, the common electrode denotes the driving electrodes TX1 to TXm and the receiving electrodes RX1 to RXn. The pixels are arranged in a matrix type in the panel 100 according to an intersection structure of the data lines and the gate lines.

A black matrix BM and a color filter are formed on an upper glass substrate of the panel 100.

The present invention relates to a display device with a built-in touch panel, which the driving electrodes TX1 to TXm and the receiving electrodes RX1 to RXn configuring the touch panel 110 are included in the panel 100.

The touch panel 110 determines whether there is a user touch, and particularly, the touch panel 110 according to an embodiment of the present invention uses a capacitive type to which a mutual type is applied.

The touch panel 110 includes the driving electrodes TX1 to TXm and the receiving electrodes RX1 to RXn.

The driving electrodes TX1 to TXm and the receiving electrodes RX1 to RXn generate a plurality of sensing signals according to the sensing pulse transferred from the touch sensing unit 600 during the touch sensing period, and during the image display period, the driving electrodes TX1 to TXm and the receiving electrodes RX1 to RXn drive the liquid crystal along with the pixel electrodes which are respectively formed in the pixels of the panel 100.

The driving electrodes TX1 to TXm and the receiving electrodes RX1 to RXn are connected to the touch sensing unit 600. In this case, the driving electrodes TX1 to TXm and the receiving electrodes RX1 to RXn may be connected to the touch sensing unit 600 through the driver 500, and may be directly connected to the touch sensing unit 600.

The touch panel 110 according to an embodiment of the present invention, as described above, uses the capacitive type, and is built into the panel 100. The driving electrodes TX1 to TXm and receiving electrodes RX1 to RXn of the touch panel 100 performs a function of the common electrode, which drives the liquid crystal along with the pixel electrodes, and a function of determining whether there is a touch.

The touch panel 100 includes the driving electrodes TX1 to TXm and the receiving electrodes RX1 to RXn which are separated from each other in a block form, are supplied with the common voltage in the image display period, and are supplied with the sensing pulse in the touch sensing period.

Each of the receiving electrodes RX1 to RXn is formed in a block form in the panel 100 in parallel with the data line.

Each of the driving electrodes TX1 to TXm includes a plurality of driving electrode parts arranged in a block form with the receiving electrode therebetween in the panel 110.

In FIG. 5, a plurality of block-form lines which are long in a height direction are the receiving electrodes RX1 to RXn, and a plurality of blocks formed between the receiving electrodes RX1 to RXn are a plurality of driving electrode parts. A plurality of driving electrode parts which are formed in one row, on one horizontal line, and between the receiving electrodes configure one driving electrode TX. Therefore, the same sensing pulse is supplied to the driving electrode parts configuring the one driving electrode TX during the touch sensing period.

However, the driving electrodes TX1 to TXm and the receiving electrodes RX1 to RXn may be provided on the contrary to this. For example, the receiving electrodes RX1 to RXn of FIG. 5 may perform a function of the driving electrode, and the driving electrodes TX1 to TXm of FIG. 5 may perform a function of the receiving electrode.

The driver 500 may include a gate driver 200 that controls signals input to the gate line, a data driver 300 that controls signals input to the data line, and a timing controller 400 that controls the gate driver 200 and the data driver 300.

The gate driver 200, the data driver 300, and the timing controller 400 which configure the driver 500, as illustrated in FIG. 5, may be configured as one integrated circuit (IC), or may be separately provided.

First, the timing controller 400 receives a timing signal, including a data enable signal and a dot clock, from an external system to generate control signals which control operation timings of the data driver 300 and the gate driver 200. Also, the timing controller 400 realigns input video data received from the external system, and outputs realigned image data to the data driver 300.

The timing controller 400 controls the data driver 300 and the gate driver 200. The timing controller 400 generates a control signal, which controls an input/output operation timing of the touch sensing unit 600, and control signals that allow the touch sensing unit 600 to apply one of the common voltage and the sensing pulse to the driving electrode, and transfers the control signals to the touch sensing unit 600.

The common voltage output to the driving electrodes and the receiving electrodes may be generated by a common voltage generator, and may be output through the driver 500 or the touch sensing unit 600 that receives the control signal from the driver 500. Also, the sensing pulse may be output through the touch sensing unit 600 that receives the control signal from the timing controller 400, or may be output from the touch sensing unit 600 and then sequentially supplied to the driving electrodes through the timing controller 400.

The timing controller 400 may generate a touch sync signal TSS that distinguishes the image display period and the touch sensing period, and transfer the touch sync signal TSS to the touch sensing unit 600.

Moreover, the timing controller 400 may transfer a data line sync signal DSS, which allows the data lines to be connected to ground, to a data line controller 700 in the sensing pulse non-output period where the sensing pulses are not supplied to the driving electrodes during the touch sensing period. The data line sync signal DSS may be generated by the timing controller 400 and output to the data line controller 700, or may be transferred from the touch sensing unit 600 to the timing controller 400 and output to the data line controller 700. Alternatively, the data line sync signal DSS may be output from the touch sensing unit 600 to the data line controller 700.

The touch sync signal TSS and the data line sync signal DSS may be generated from the timing signal.

Second, the data driver 300 converts the image data, input from the timing controller 400, into data voltages and respectively supplies the data voltages for one horizontal line to the data lines at every one horizontal period. That is, the data driver 300 converts the image data into the data voltages by using a plurality of gamma voltage supplied from a gamma voltage generator (not shown), and respectively outputs the data voltages to the data lines.

The data driver 300 shifts a source start pulse transferred from the timing controller 400 according to a source shift clock to generate a sampling signal. The data driver 300 latches the image data, which are input according to the source shift clock, according to the sampling signal and converts the latched image data into the data voltages. Then, the data driver 300 supplies the data voltages to the data lines in units of a horizontal line in response to a source output enable signal.

To this end, the data driver 300 may include a shift register, a latch, a digital-to-analog converter (DAC), and an output buffer.

Third, the gate driver 200 sequentially supplies a scan pulse to the gate lines by using gate control signals generated by the timing controller 400. In response to the scan pulse, TFTs of the panel 100 are driven in units of a horizontal line of the panel 100.

In the touch sensing period, the touch sensing unit 600 sequentially supplies the sensing pulse to the driving electrodes TX1 to TXm to determine whether the touch panel 110 is touched.

The touch sensing unit 600 includes a driver (not shown), which sequentially outputs the sensing pulse to the driving electrodes TX1 to TXm, and a receiver (not shown) that determines whether the driving electrodes RX1 to RXn are touched, by using a plurality of sensing signals respectively received from the driving electrodes RX1 to RXn.

The touch sensing unit 600 may generate the data line sync signal DSS which allows the data lines to be connected to ground, and output the data line sync signal DSS to the timing controller 400, in the sensing pulse non-output period where the sensing pulses are not supplied to the driving electrodes during the touch sensing period. The data line sync signal DSS is a signal synchronized with the sensing pulse SP.

The touch sensing unit 600 may be provided in the driver 500. In particular, the touch sensing unit 600 may be provided as one body with the timing controller 400.

Moreover, the sensing pulses may be output from the touch sensing unit 600, and may be directly transferred to the driving electrodes. Alternatively, the sensing pulses may be transferred to the driving electrodes through the driver 500, and particularly, may be transferred to the driving electrodes through the timing controller 400.

The data line controller (not shown) connects the data lines to ground in the sensing pulse non-output period where the sensing pulses are not supplied to the driving electrodes TX1 to TXm during the touch sensing period.

In particular, during a touch preparation period until before the sensing pulse is supplied to the driving electrodes after the touch sensing period arrives, the data line controller (not shown) connects the data lines of the panel 100 to ground, and in the sensing pulse output period where the sensing pulses are supplied to the driving electrodes, the data line controller floats the data lines until the touch sensing period is ended after the touch preparation period.

Moreover, during the touch sensing period, the data line controller floats the data lines in the sensing pulse output period where the sensing pulses are supplied to the driving electrodes. During the touch sensing period, the data line controller repeatedly performs an operation of connecting the data lines to ground.

That is, the data line controller connects the data lines to ground or floats the data lines according to the data line sync signal DSS received from the driver 500.

A detailed configuration and function of the data line controller (not shown) will be described below in detail with reference to the accompanying drawings.

Figure 6:
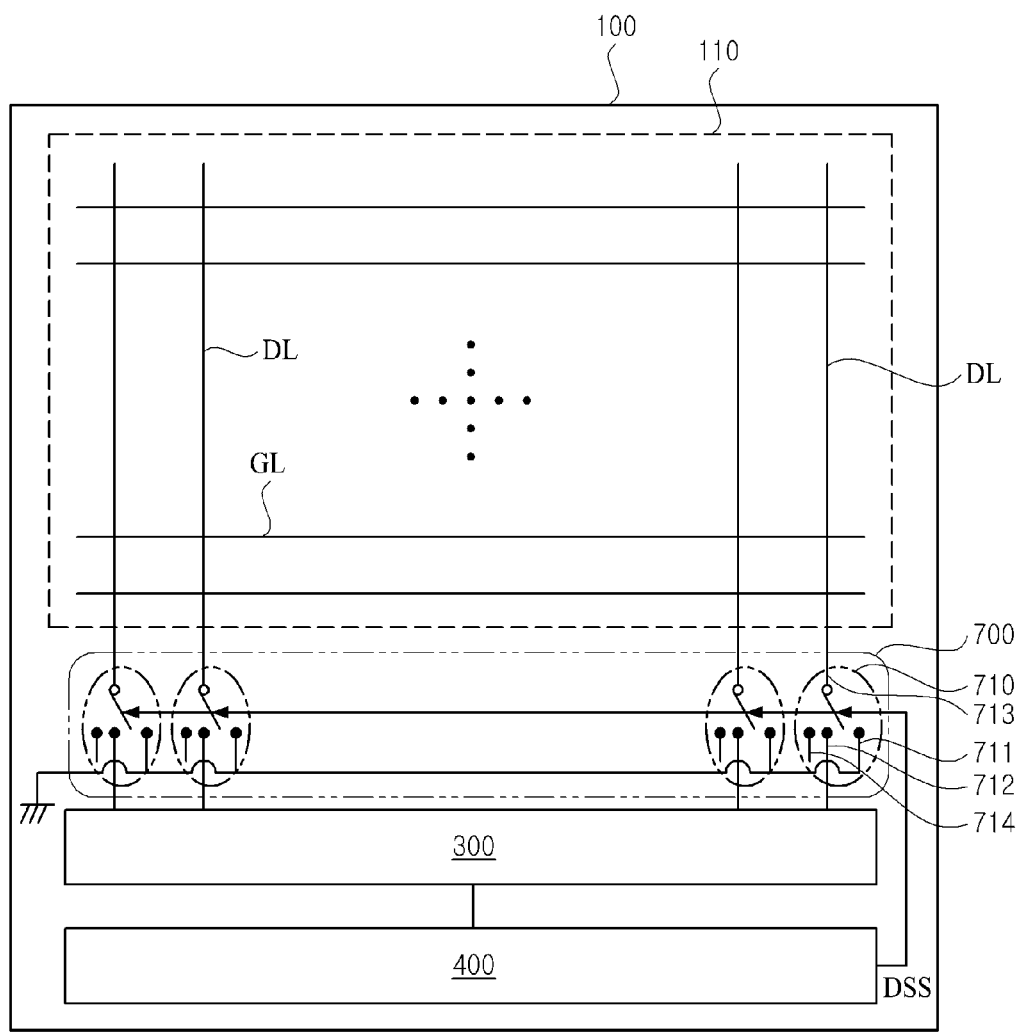
FIG. 6 is an exemplary diagram schematically illustrating a configuration of a display device according to a first embodiment of the present invention.
Figure 7:
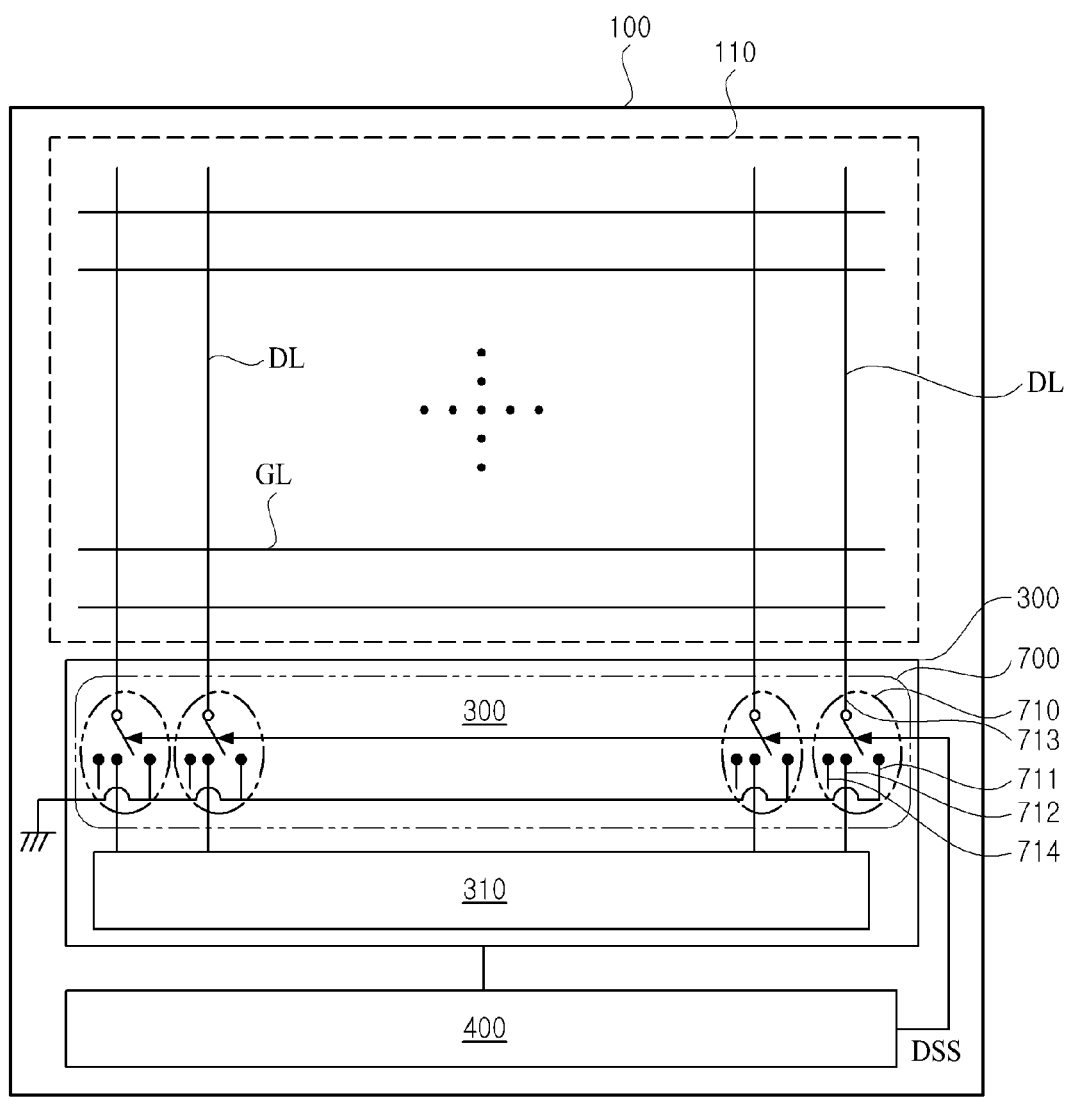
FIG. 7 is an exemplary diagram schematically illustrating a configuration of a display device according to a second embodiment of the present invention.

FIG. 6 is an exemplary diagram schematically illustrating a configuration of a display device according to a first embodiment of the present invention, and FIG. 7 is an exemplary diagram schematically illustrating a configuration of a display device according to a second embodiment of the present invention.

The display device according to the present invention, as illustrated in FIGS. 5 to 7, includes a panel 100 into which a touch panel 110 including a plurality of driving electrodes TX1 to TXm and a plurality of receiving electrodes RX1 to RXn is built; a touch sensing unit 600 that sequentially supplies a sensing pulse to the driving electrodes to determine whether the touch panel 110 is touched, during a touch sensing period; a driver 500 that drives the panel 100 to allow the panel 100 to display an image during an image display period; a data line controller 700 that connects a plurality of data lines to a ground in a sensing pulse non-output period where a plurality of the sensing pulses are not supplied to the driving electrodes during the touch sensing period.

In other words, the display device includes: a display panel 100 including a display portion and a touch portion 110, the display portion including a plurality of data lines, and the touch portion 110 including a plurality of driving electrodes TX1 to TXm and a plurality of receiving electrodes RX1 to RXn; a data driver 300 configured to drive the display portion of the display panel 100; a plurality of switches 710 each switch which is coupled to a corresponding one of the plurality of data lines; and a controller 400 configured to control operation of the plurality of switches, wherein the controller controls the switches to: connect the plurality of data lines to the data driver 300 during a display period of a frame, connect the plurality of data lines to ground during a preparation portion of a sense period of the frame, and float one or more of the plurality of data lines during a sensing portion of the sensing period while a plurality of sensing pulses are supplied to at least one of the plurality of driving electrodes.

Here, the panel 100, the touch panel 110, the driver 500, and the touch sensing unit 600 have the same details as those described above with reference to FIG. 5, and thus, their detailed descriptions are not provided. Hereinafter, therefore, a configuration of the data line controller 700 will be described in detail.

The data line controller 700 connects the data lines to ground in the sensing pulse non-output period where the sensing pulses are not supplied to the driving electrodes TX1 to TXm during the touch sensing period.

In particular, during a touch preparation period until before the sensing pulse is supplied to the driving electrodes after the touch sensing period arrives, the data line controller 700 connects the data lines of the panel 100 to ground, and in the sensing pulse output period where the sensing pulses are supplied to the driving electrodes, the data line controller floats the data lines until the touch sensing period is ended after the touch preparation period.

Moreover, during the touch sensing period, the data line controller floats the data lines in the sensing pulse output period where the sensing pulses are supplied to the driving electrodes. During the touch sensing period, the data line controller repeatedly performs an operation of connecting the data lines to ground.

That is, the data line controller connects the data lines to ground or floats the data lines according to the data line sync signal DSS received from the driver 500, particularly, the timing controller 400.

The driver 500, as described above, includes the data driver 300 that supplies data voltages to the data lines of the panel 100, and the data line controller 700 that is connected to the data driver 300.

In this case, in the display device according to the first embodiment of the present invention, as illustrated in FIG. 6, the data line controller 700 is separated from the data driver 300 and the timing controller 400, and is separately provided in a non-display area of the panel 100.

However, in the display device according to the second embodiment of the present invention, as illustrated in FIG. 7, the data line controller 700 is provided in the data driver 300. That is, in the display device according to the second embodiment of the present invention, the data line controller 700 is provided as one body with the data driver 300.

That is, in the display device according to the present invention, the data driver 300 may be separated from the data driver 300, and may be provided in the non-display area of the panel 100 or in the data driver 300.

Moreover, the data line controller 700 may be provided in the driver 500. That is, the data line controller 700 may be provided as one body with the driver 500.

To perform the above-described function, as illustrated in FIGS. 6 and 7, the data line controller 700 may include a number of switches 710 corresponding to the number of the data lines. For example, when the data line is formed as 5760 (=1920×3), 5760 switches 710 may be provided in the non-display area of the panel 100, in the data driver 300, or in the driver 500.

In some embodiments, each switch may be a triple-throw switch that connects the third terminal to one of the first, second or fourth terminal.

Each of the switches 710 includes a first terminal 711 connected to ground, a second terminal 712 connected to the data driver 300, a third terminal 713 connected to the data line DL, and a fourth terminal 714 which is floated.

The first terminal 711 is connected to ground formed in a printed circuit board (PCB, not shown) which is connected to the non-display area of the panel 100, the data driver 300, the driver 400, or the panel 100.

That is, ground GND may be formed in the panel 100 and various elements which are electrically connected to the panel 100, and is connected to the first terminal 711.

The second terminal 712 is connected to the data driver 300. In particular, the second terminal 712 is connected to a data output line (not shown) that is connected to the data driver 300 and respectively outputs the data voltages to the data lines.

In the first embodiment of the present invention illustrated in FIG. 6, when the data driver 300 is provided as an IC and mounted on the panel 100, and the data line controller 700 is mounted on the non-display area of the panel 100 independently from the data driver 300, the second terminal 712 is connected to an output terminal, through which the data voltage is output, among a plurality of output terminals of the data driver. In this case, the output terminal is the data output line.

In the second embodiment of the present invention illustrated in FIG. 7, when the data line controller 700 is provided in the data driver 300, the second terminal 712 is connected to an output terminal of the DAC or an output terminal of the output buffer.

The DAC configuring the data driver 300 converts image data, transferred from the timing controller 400, into data voltages. The image data are digital values, and the data voltages are analog values. That is, the data driver 300 converts the image data, which are the digital values, into the data voltages that are the analog values.

In this case, the data voltages output to the DAC are generated in units of a data line. Therefore, the DAC includes a number of output terminals corresponding to the number of the data lines.

Therefore, the second terminal 712 may be connected to the DAC, and connected to the output terminal.

Moreover, the output buffer simultaneously outputs the data voltages, transferred from the DAC, to the respective data lines during one horizontal period according to the control signal transferred from the timing controller 400.

In this case, the output terminals of the output buffer are connected to the data lines in one-to-one correspondence relationship.

Therefore, the second terminal 712 may be connected to the output terminal connected to the output buffer.

That is, when the data line controller 700 is provided in the data driver 300, the second terminal of each of the switches 710 configuring the data line controller 700 may be connected to an output terminal of the DAC or the output terminal of the output buffer.

Moreover, in the first embodiment of the present invention, when the data line controller 700 is provided independently from the data driver 300, the second terminal 712 may be connected to the output terminal of the output buffer.

The third terminal 713 is connected to the data line DL.

The fourth terminal 714 is floated. That is, a voltage is not supplied to the fourth terminal 714. However, the fourth terminal 714 may be omitted. In this case, when the data line DL is floated, the switch 710 may disallow the third terminal 713, connected to the data line 713, to be connected to the first and second terminals 711 and 712, thereby allowing the data line to be floated.

Each of the switches 710 connects the first terminal 711 to the third terminal 713 according to the data line sync signal DSS received from the driver 500, in the sensing pulse non-output period where the sensing pulses are not supplied to the driving electrodes TX1 to TXm during the touch sensing period.

Moreover, each of the switches 710 may connect the fourth terminal 714 to the third terminal 713 or disallow the third terminal 713 to be connected to the first and second terminals 711 and 712 according to the data line sync signal DSS in the sensing pulse output period where the sensing pulses are supplied to the driving electrodes TX1 to TXm during the touch sensing period.

Hereinafter, a method of driving the display device according to an embodiment of the present invention will be described in detail with reference to FIGS. 5 to 7.

FIG. 8 is an exemplary diagram showing various kinds of waveforms applied to a method of driving a display device according to an embodiment of the present invention. In FIG. 8, a signal referred to by SS is a sensing signal received from each of the receiving electrodes RX1 to RXn.

In the image display period (a period illustrated as Display in FIG. 8), the driver 500 drives the data driver 300 and the gate driver 200 to allow the panel 100 to display an image.

When the touch sync signal TSS transferred from the driver 500 is the touch sensing period (a period illustrated as Touch in FIG. 8), as shown in FIG. 8, the touch sensing unit 600 sequentially outputs the sensing pulse SP to the driving electrodes TX1 to TXm.

During the touch preparation period until before the sensing pulse is supplied to the driving electrodes TX1 to TXm after the touch sensing period arrives, the data line controller 700 connects the data lines of the panel 100 to ground.

For example, when the touch sensing period arrives, as shown in FIG. 8, the driver 500 transfers the data line sync signal DSS having a high level to the data line controller 700.

In this case, the data line controller 700 connects the third terminal 713 of each of the switches 710, connected to the data line DL, to the first terminal 711 connected to ground. That is, the data line controller 700 switches on the switches 710 to connect the data lines DL to ground.

The data lines DL are connected to ground before the sensing pulse SP is supplied to the driving electrodes, and thus are stabilized. Accordingly, an accuracy of subsequent touch determination can be enhanced.

The data line controller 700 floats the data lines in the sensing pulse output period Y (where the sensing pulses are respectively supplied to the driving electrodes) until the touch sensing period is ended after the touch preparation period X. This will now be described in detail.

During the sensing pulse output period Y where the sensing pulses are supplied to the driving electrodes during the touch sensing period, the driver 500 transfers the data line sync signal DSS having a low level to the switches 710.

In this case, each of the switches 710 connects the third terminal 713, connected to the data line DL, to the fourth terminal 714 which is maintained in a floating state. In another method, each of the switches 710 disallows the third terminal 713 to be connected to the first and second terminals 711 and 712. Therefore, the data line DL is floated.

Since the data line DL is floated, a parasitic capacitor is not formed between the data line and the receiving electrodes RX1 to RXn. Accordingly, a touch sensitivity of the touch sensing unit 600 can be enhanced.

During the sensing pulse non-output period Z where the sensing pulses are not supplied to the driving electrodes during the touch sensing period, the driver 500 transfers the data line sync signal DSS having a high level to the switches 710.

In this case, the data line controller 700 connects the third terminal 713 of each of the switches 710, connected to the data line DL, to the first terminal 711 connected to ground. That is, the data line controller 700 switches on the switches 710 to connect the data lines DL to ground.

The data lines DL are connected to ground in the sensing pulse non-output period Z, and thus are stabilized. Accordingly, an accuracy of subsequent touch determination can be enhanced.

The data line controller 700 repeatedly performs an operation that floats the data lines in the sensing pulse output period Y according to the data line sync signal DSS, and connects the data lines to ground in the sensing pulse non-output period Z.

For example, as shown in FIG. 8, when the touch sensing period arrives, during the touch preparation period X, the data line controller 700 connects the data lines to ground GND.

After the touch preparation period X ends, and during the sensing pulse output period Y where the sensing pulses SP are supplied to the first driving electrode TX1, the data line controller 700 maintains the data lines in a floating state.

The sensing pulse SP is supplied to the first driving electrode TX1. During the sensing pulse non-output period Z where the sensing pulse SP is not supplied to the driving electrodes, the data line controller 700 connects the data lines to ground GND.

After the sensing pulse non-output period Z ends, and during the sensing pulse output period Y where the sensing pulse SP is supplied to the second driving electrode TX2 arrives, the data line controller 700 maintains the data lines in a floating state.

That is, the data line controller 700 maintains the data lines in a floating state in the sensing pulse output period Y where the sensing pulse is sequentially supplied from the first driving electrode TX1 to an mth driving electrode TXm during the touch sensing period. Also, the data line controller 700 connects the data lines to ground in the sensing pulse non-output period Z where the sensing pulse is not supplied to the driving electrodes.

According to the above-described embodiments of the present invention, the data lines are connected to ground GND before the sensing pulses are supplied to the driving electrodes, and thus are stabilized. Accordingly, an accuracy of subsequent touch determination can be enhanced.

Moreover, according to the above-described embodiments of the present invention, in a period where the sensing pulses are supplied to the driving electrodes, since the data lines are floated, a parasitic capacitor is not formed between the data line and the receiving electrodes. Accordingly, a touch sensitivity of the touch sensing unit 600 can be enhanced.

In order to stabilize the data lines, the data lines are connected to ground before the sensing pulse is supplied to the driving electrode during the touch sensing period. Subsequently, while the sensing pulse is being sequentially supplied to the driving electrodes, the data lines are maintained in a floating state during the sensing pulse output period where the sensing pulse is substantially supplied to the driving electrodes, and thus, the number of parasitic capacitors which are formed between the data lines and the receiving electrodes from which the sensing signals are substantially received can be reduced, thereby enhancing touch sensitivity. Also, while the sensing pulse is being sequentially supplied to the driving electrodes, the data lines are connected to ground in the sensing pulse non-output period where the sensing pulse is not supplied to the driving electrodes, and thus are stabilized, thereby enhancing touch sensitivity.

According to the embodiments of the present invention, the data lines are connected to ground before the sensing pulses are supplied to the driving electrodes, and thus are stabilized. Accordingly, an accuracy of subsequent touch determination can be enhanced.

Moreover, according to the embodiments of the present invention, the data lines are floated during a period where the sensing pulses are supplied to the driving electrodes, and thus, a parasitic capacitor is not formed between the data line and the receiving electrodes. Accordingly, a touch sensitivity of the touch sensing unit can be enhanced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of driving a display device, the method comprising:

connecting a plurality of data lines, formed in a panel, to ground during a touch preparation period after a touch sensing period arrives until a plurality of sensing pulses are supplied to a plurality of driving electrodes, the plurality of sensing pulses including at least a first set of sensing pulses to be applied to a first driving electrode of the plurality of driving electrodes during a first portion of the touch sensing period, and a second set of sensing pulses to be supplied to a second driving electrode of the plurality of driving electrodes during a second portion of the touch sensing period;

floating the plurality of data lines while the first set of sensing pulses are supplied to the first of driving electrode after the touch preparation period;

connecting the plurality of data lines to ground while no sensing pulse is supplied to the plurality of driving electrodes, after the first set of sensing pulses have been supplied to the first driving electrode, but before the second set of sensing pulses are supplied to the second driving electrode; and floating the plurality of data lines while the second set of sensing pulses are supplied to the second of driving electrode.

2. The method of claim 1, wherein the floating of the data lines comprises repeatedly performing an operation that floats the plurality of data lines in a sensing pulse output period where the plurality of sensing pulses are supplied to the plurality of driving electrodes during the touch sensing period, and connects the plurality of data lines to ground in a sensing pulse non-output period where the plurality of sensing pulses are not supplied to the plurality of driving electrodes during the touch sensing period.

3. A display device comprising:

a panel into which a touch panel including a plurality of driving electrodes and a plurality of receiving electrodes is built;

a touch sensing unit configured to supply a plurality of sensing pulses to the plurality of driving electrodes during a touch sensing period, the plurality of sensing pulses including at least a first set of sensing pulses to be applied to a first driving electrode of the plurality of driving electrodes during a first portion of the touch sensing period, and a second set of sensing pulses to be supplied to a second driving electrode of the plurality of driving electrodes during a second portion of the touch sensing period;

a driver configured to drive the panel to allow the panel to display an image during an image display period; and a data line controller configured to:

float a plurality of data lines while the first set of sensing pulses are supplied to the first of driving electrode;

connect the plurality of data lines to ground while no sensing pulse is supplied to the plurality of driving electrodes, after the first set of sensing pulses have been supplied to the first driving electrode, but before the second set of sensing pulses are supplied to the second driving electrode; and float the plurality of data lines while the second set of sensing pulses are supplied to the second of driving electrode.

4. The display device of claim 3, wherein,
during a touch preparation period after the touch sensing period arrives until the plurality of sensing pulses are supplied to the plurality of driving electrodes, the data line controller connects the plurality of data lines, formed in the panel, to ground.

5. The display device of claim 3, wherein the data line controller repeatedly performs an operation that floats the plurality of data lines in a sensing pulse output period where the plurality of sensing pulses are supplied to the plurality of driving electrodes during the touch sensing period, and connects the plurality of data lines to ground during the sensing pulse non-output period in the touch sensing period.

6. The display device of claim 3, wherein the data line controller connects the data lines to ground or floats the data lines according to a data line sync signal received from the driver.

7. The display device of claim 3, wherein,
the driver comprises a data driver configured to respectively supply a plurality of data voltages to the plurality of data lines formed in the panel, and
the data line controller is connected to the data driver.

8. The display device of claim 7, wherein,
the data line controller comprises a plurality of switches corresponding to a number of the data lines, and
each of the plurality of switches comprises a first terminal connected to ground, a second terminal connected to the data driver, a third terminal connected to a corresponding data line, and a fourth terminal which is floated.

9. The display device of claim 8, wherein,
each of the plurality of switches connects the first terminal to the third terminal according to a data line sync signal received from the driver, in the sensing pulse non-output period where the plurality of sensing pulses are not supplied to the plurality of driving electrodes during the touch sensing period, and
each of the plurality of switches connects the fourth terminal to the third terminal according to the data line sync signal, in a sensing pulse output period where the plurality of sensing pulses are supplied to the plurality of driving electrodes during the touch sensing period.

10. The display device of claim 7, wherein the data line controller is provided as one body with the data driver.

11. A method for driving a display device, the method comprising:
connecting a plurality of data lines of the display panel to a data driver to drive a display portion of the display device during a display period of a frame; and
driving a touch sensor portion of the display device during a sense period of the frame, wherein driving the touch sensor comprises:
connecting the plurality of data lines to ground during a preparation portion of the sense period;
sequentially supplying a plurality of sensing pulses to a plurality of driving electrodes during a sensing portion of the sense period, the plurality of sensing pulses including at least a first set of sensing pulses to be applied to a first driving electrode of the plurality of driving electrodes during a first portion of the sense period, and a second set of sensing pulses to be supplied to a second driving electrode of the plurality of driving electrodes during a second portion of the sense period;
floating one or more of the plurality of data lines during the sensing portion of the sense period while the first set of sensing pulses are being supplied to at least one of the plurality of driving electrodes;
connecting the plurality of data lines to ground while no sensing pulse is supplied to the plurality of driving electrodes, after the first set of sensing pulses have been supplied to the first driving electrode, but before a second set of sensing pulses are supplied to the second driving electrode; and
floating the plurality of data lines while the second set of sensing pulses are supplied to the second driving electrode.

12. A display device comprising:
a display panel including a display portion and a touch portion, the display portion including a plurality of data lines, and the touch portion including a plurality of driving electrodes and a plurality of receiving electrodes;
a data driver configured to drive the display portion of the display panel;
a plurality of switches each of which is coupled to a corresponding one of the plurality of data lines; and
a controller configured to control operation of the plurality of switches, wherein the controller controls the switches to:
connect the plurality of data lines to the data driver during a display period of a frame;
connect the plurality of data lines to ground during a preparation portion of a sense period of the frame, until a plurality of sensing pulses are supplied to the plurality of driving electrodes, the plurality of sensing pulses including at least a first set of sensing pulses to be applied to a first driving electrode of the plurality of driving electrodes during a first portion of the sense period, and a second set of sensing pulses to be supplied to a second driving electrode of the plurality of driving electrodes during a second portion of the sense period; and
float one or more of the plurality of data lines during a sensing portion of the sense period while the first set of sensing pulses are supplied to the first driving electrode;
connect the plurality of data lines to ground while no sensing pulse is supplied to the plurality of driving electrodes, after the first set of sensing pulses have been supplied to the first driving electrode, but before the second set of sensing pulses are supplied to the second driving electrode; and
float the plurality of data lines while the second set of sensing pulses are supplied to the second driving electrode.

13. The display device of claim 12, wherein the controller further controls the switches to connect the plurality of data lines to ground, subsequent to floating one or more of the plurality of data lines, during the sensing portion of the sense period while sensing pulses are not supplied to any of the plurality of driving electrodes.

14. The display device of claim 12, wherein each of the plurality of switches comprises a triple-throw switch, the triple-throw switch including:
a first terminal for connection to ground;
a second terminal for connection to the data driver;
a third terminal for connection to a data line of the plurality of data lines; and
a fourth terminal, the fourth terminal being floated.

* * * * *